United States Patent
Groth et al.

(10) Patent No.: US 11,717,962 B2
(45) Date of Patent: Aug. 8, 2023

(54) METHOD FOR CONTROLLING MOVEMENT OF A ROBOT

(71) Applicant: ABB Schweiz AG, Baden (CH)

(72) Inventors: Tomas Groth, Vaesteras (SE); Arne Wahrburg, Darmstadt (DE)

(73) Assignee: ABB Schweiz AG, Baden (CH)

( * ) Notice: Subject to any disclaimer, the term of this patent is extended or adjusted under 35 U.S.C. 154(b) by 342 days.

(21) Appl. No.: 17/170,911

(22) Filed: Feb. 9, 2021

(65) Prior Publication Data
US 2021/0162598 A1 Jun. 3, 2021

Related U.S. Application Data

(63) Continuation of application No. PCT/EP2018/071778, filed on Aug. 10, 2018.

(51) Int. Cl.
*B25J 9/16* (2006.01)
*B25J 9/06* (2006.01)

(52) U.S. Cl.
CPC .......... *B25J 9/1651* (2013.01); *B25J 9/06* (2013.01); *G05B 2219/39322* (2013.01); *G05B 2219/43188* (2013.01); *G05B 2219/50391* (2013.01)

(58) Field of Classification Search
CPC .......... B25J 9/06; B25J 9/1633; B25J 9/1651; G05B 2219/39195; G05B 2219/39243; G05B 2219/39322; G05B 2219/39329; G05B 2219/43188; G05B 2219/50391
See application file for complete search history.

(56) References Cited

U.S. PATENT DOCUMENTS

| | | | | |
|---|---|---|---|---|
| 5,737,500 A | * | 4/1998 | Seraji | B25J 9/1643 700/262 |
| 10,035,266 B1 | * | 7/2018 | Kroeger | B25J 9/1664 |
| 2003/0171847 A1 | | 9/2003 | Cheng et al. | |
| 2012/0004775 A1 | | 1/2012 | Andoh | |

FOREIGN PATENT DOCUMENTS

WO WO 2011067621 A1 6/2011
WO WO 2014146120 A1 9/2014

* cited by examiner

*Primary Examiner* — Dale Moyer
(74) *Attorney, Agent, or Firm* — Leydig, Voit & Mayer, Ltd.

(57) ABSTRACT

A method for controlling movement of a robot having a plurality of links connected by rotatably driven joints includes the steps of: a) defining a target speed vector of a reference point of the robot in Cartesian space; b) determining rotation speeds ($\dot{q}_{ref}$) of the joints which minimize a weighted sum, the weighted sum having for summands i) a discrepancy ($\|\dot{x}_{ref}^k - J\dot{q}_{ref}^k\|_{W_x}$) between the target speed vector ($\dot{x}_{ref}$) and an actual speed vector ($\dot{x}_{act}$) calculated from actual rotation speeds of the joints; and ii) a rate of change $$\left(\frac{1}{T_s}\|\dot{q}_{ref}^k - \dot{q}_{ref}^{k-1}\|_{W_a}\right)$$

of the target rotation speeds; and c) setting the rotation speeds ($\dot{q}_{ref}$) determined in step (b) as target rotation speeds of the joints.

9 Claims, 2 Drawing Sheets

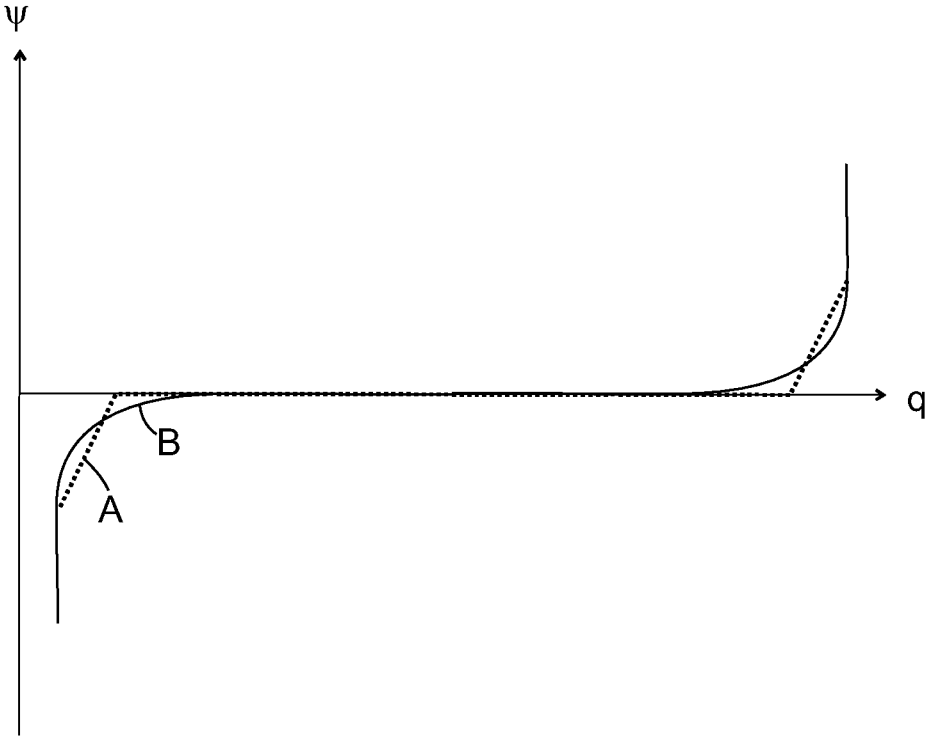

METHOD FOR CONTROLLING MOVEMENT OF A ROBOT

CROSS-REFERENCE TO PRIOR APPLICATION

This application is a continuation of International Patent Application No. PCT/EP2018/071778, filed on Aug. 10, 2018, the entire disclosure of which is hereby incorporated by reference herein.

FIELD

The present invention relates to a method for controlling movement of an articulated robot, i.e. of a robot comprising at least one arm in which a plurality of links are connected to each other by rotatable joints, and rotation of each joint is driven by a motor.

BACKGROUND

The arm has a proximal end which is mounted on a support, which, in the context of the present description, will be assumed to be immobile, and a distal end to which an end effector such as a gripper, a welding tool, a drill, a machining tool, a grinding tool etc. can be mounted.

In order to define a target pose, i.e. position and orientation, of the end effector completely, six coordinates are required. A convenient way for specifying the pose is by a six-component vector x, three components of which define Cartesian coordinates of a reference point in three-dimensional space, such as the Tool Center Point TCP, and three of which define angles of an axis of the robot extending through the reference point. An alternative way of specifying the pose is by means of rotation angles of the joints of the robot, combined into a vector q. The number of components of the vector q corresponds to the number of axes by which the links of the robot can rotate; it can be higher than 6, in which most poses of the end effector can be realized with a variety of poses of the links.

In most practical applications, regardless of whether the movement of the robot is force controlled or position controlled, what is actually specified, as a function of a distance between the current position and the target position of the reference point, or in function of a target force to be applied to the reference point, is a target speed $\dot{x}_{ref}$ of the reference point in Cartesian space. This speed vector $\dot{x}_{ref}$ is related to a vector $\dot{q}_{ref}$ of target rotational speeds of the joints by $$\dot{x}_{ref} = J\dot{q}_{ref},$$

i.e. when $\dot{x}_{ref}$ is predetermined, then the corresponding vector of target rotation speeds is $$\dot{q}_{ref} = J^{-1}\dot{x}_{ref}.$$

High-bandwidth force control may result in high Cartesian acceleration (i.e. rapid changes of $\dot{x}_{ref}$ which in turn leads to high joint level accelerations $\ddot{q}_{ref}$. These accelerations can excite mechanical resonances and result in an unstable behaviour especially in contact situations where the robot is decelerated abruptly by abutting against a rigid obstacle. I.e. when the actual speed of the robot decreases because it is blocked by an obstacle, then the driving torque applied to its joints may increase sharply in the attempt to maintain the target speed in spite of increased resistance.

SUMMARY

In an embodiment, the present invention provides a method for controlling movement of a robot comprising a plurality of links connected by rotatably driven joints, the method comprising the steps of: a) defining a target speed vector of a reference point of the robot in Cartesian space; b) determining rotation speeds ($\dot{q}_{ref}$) of the joints which minimize a weighted sum, the weighted sum having for summands i) a discrepancy ($\|\dot{x}_{ref}^k - J\dot{q}_{ref}^k\|_{W_x}$) between the target speed vector ($\dot{x}_{ref}$) and an actual speed vector ($\dot{x}_{act}$) calculated from actual rotation speeds of the joints; and ii) a rate of change $$\left(\frac{1}{T_s}\|\dot{q}_{ref}^k - \dot{q}_{ref}^{k-1}\|_{W_a}\right)$$

of the target rotation speeds; and c) setting the rotation speeds ($\dot{q}_{ref}$) determined in step (b) as target rotation speeds of the joints.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is a graph of a summand that intervenes in the control of the robot according to a preferred embodiment.

DETAILED DESCRIPTION

Figure 1:
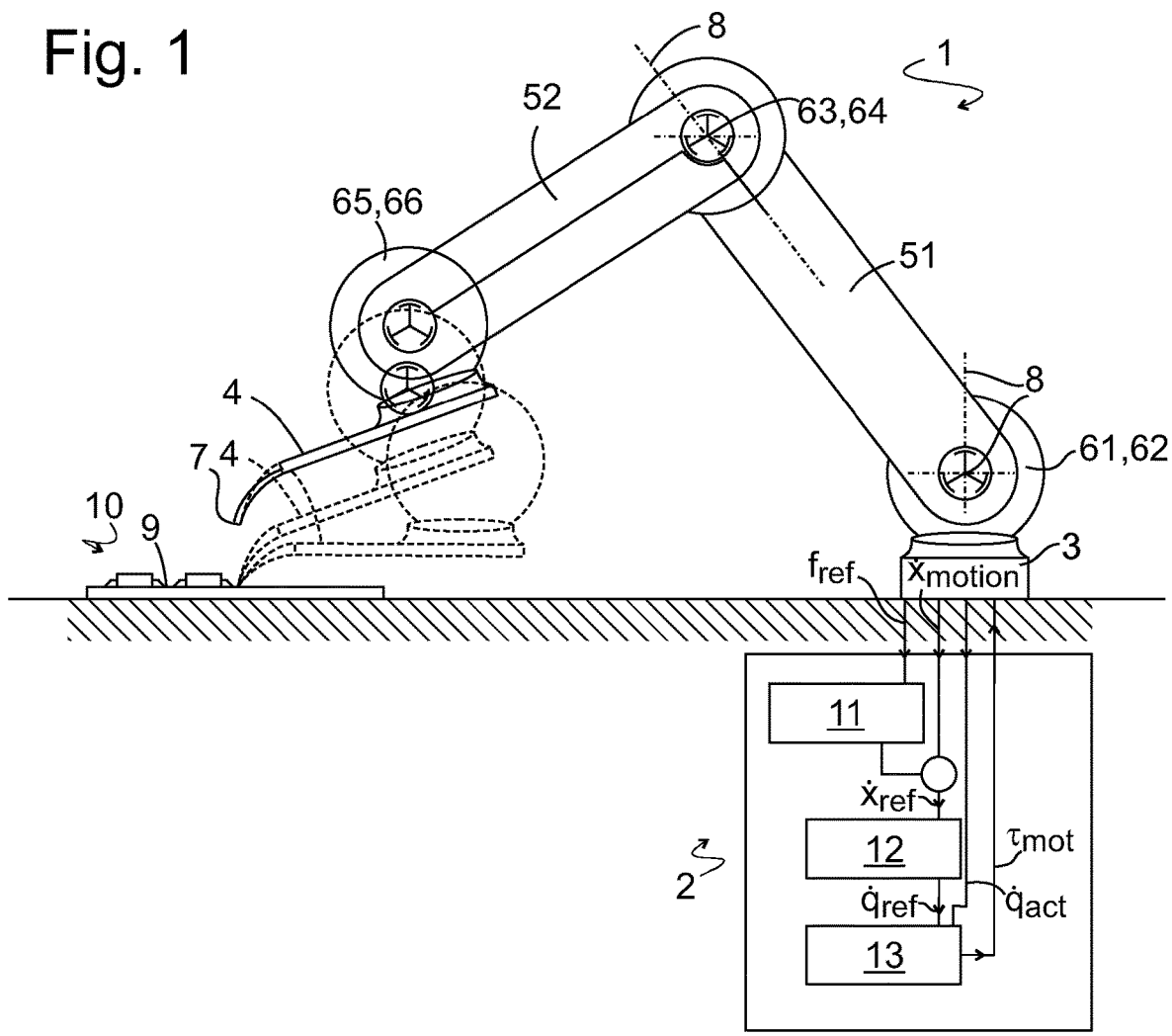
FIG. 1 schematically illustrates a robot that can be controlled by the method of the invention.

In an embodiment, the present invention provides a method for controlling movement of a robot in which the risk of destabilisation is reduced even in case of unforeseen contact with an obstacle.

In an embodiment, the present invention provides a method for controlling movement of a robot comprising a plurality of links connected by rotatably driven joints, which comprises the steps of a) defining a target speed vector of a reference point of the robot in Cartesian space;

b) determining rotation speeds of the joints which minimize a weighted sum, the weighted sum having for summands i) a discrepancy between the target speed vector and an actual speed vector calculated from actual rotation speeds of the joints; and ii) a rate of change of the target rotation speeds; and c) setting the rotation speeds determined in step (b) as target rotation speeds of the joints.

By taking the of change of the target rotation speeds into account when calculating the weighted sum, the rate of change of the rotation speeds that occurs when the advance of the robot is blocked by an obstacle can be limited, temporarily allowing a higher discrepancy between the speed vectors—and, hence, between the position the robot has actually reached and the position it would have reached if the obstacle had not been hit.

According to a preferred embodiment of the method, the discrepancy is weighted by direction of translation and/or rotation. I.e. there can be one or two directions in three-dimensional space in which a discrepancy is weighted heavily, while in the remaining direction (or directions) a discrepancy is tolerated rather generously.

In particular, it can be appropriate to allow generously discrepancies in the directions parallel to the surface of a workpiece, while controlling rather strictly the position perpendicular to the surface, so that when the end effector hits the surface under an oblique angle, angular accelerations may be reduced by allowing the end effector to glide along the surface, while at the same time avoiding an overshoot of contact force in the direction of the surface normal, which might leave undesired traces on the workpiece surface.

Such a type of control can be particularly appropriate when the end effector is a tool which, when used, would be moved parallel to the surface, such as a machining, grinding or polishing tool.

For other types of tools, it may be preferable to control translation rather strictly, no matter in which direction, and to allow rotation rather generously instead. In that way, movement of a pointed tool such as a drill, a point welding tool or the like, along a workpiece surface—that might produce scratches on the surface if moved along that surface under an excessive force—can be reduced to a minimum.

Further, the rate of change can also to advantage be weighted by joint.

Specifically, a proximal joint has a larger moment of inertia to drive than a distal one, and should therefore have its angular acceleration weighted higher than that of a distal joint. In that way, a distal joint can yield rather easily if the movement of the reference point is blocked by an obstacle, so that the movement of links on the proximal side of that joint can be decelerated gradually.

The discrepancy between the target and actual speed vectors can be obtained as the scalar product of a vector difference between the target speed vector in Cartesian space and a speed vector in Cartesian space calculated from the determined rotation speeds, and said vector difference multiplied by a weighting matrix.

In analogy thereto, the rate of change of the target rotation speeds can be calculated as the scalar product of a vector difference between a vector of the target rotation speeds and the vector of rotation speeds at a previous instant multiplied by a weighting matrix.

In practice, many joints of a robot are not free to rotate indefinitely but have a limited angle range. Whenever such a joint reaches a limit of its angle range, rotation is stopped abruptly, which, just like hitting an obstacle, can cause the robot to oscillate and control thereof to become instable. In order to prevent a joint from reaching an angle limit, approaching it can be penalized by introducing a third summand of the weighted sum which is neutral when the joint is far from a limit of the angle range and is high when the joint is close to and approaching the limit, and/or moving away from the angle limit can be assigned a bonus in that the third summand is low when the joint is close to the limit and moving away from it. Specifically, the neutral value of the third summand can be zero, while the high value is positive and the low value is negative.

In order to prevent the joint reliably from reaching the limit, the high value can be divergent at the limit.

Further features and advantages of the invention will become apparent from the following description of embodiments thereof referring to the appended drawings.

FIG. 1 illustrates a robot system comprising a robot arm 1 and its associated controller 2. The robot arm 1 comprises a base 3, an end effector 4, an arbitrary number of links 5$i$, i=1, 2, ... and joints 6$j$, j=1, 2, ... which connect to the links 5$i$ to each other, to the base 3 or to the end effector 4. For the sake of simplicity it will be assumed here that each joint has one degree of rotational freedom, i.e. is rotatable around a single axis 8. A given link 5$i$ can be rotatable with respect to a neighbouring link 5($i$+1) or 5($i$−1) about two different axes; in that case—although the connection might in practice be formed by a single ball joint—it will be assumed here that the links are connected by two joints, each having one degree of rotational freedom.

The end effector 4 is a tool of any desired type, such as a gripper, a welding or soldering tool, a drill, a machining tool, a grinding tool etc. In FIG. 1 the end effector 4 is a soldering tool having a tip for its tool center point 7.

The electronic controller 2 controls the movement of the robot arm 1, e.g. placing the TCP 7 on a soldering pad at a surface 9 of a workpiece 10. For simplicity, let us assume that coordinates of points where the TCP 7 is to be placed, desired speeds for moving from one such point to the other etc. are defined in a Cartesian coordinate system whose z axis is normal to the surface 9, and whose x and y axes extend in the plane of surface 9.

The controller 2 transforms desired coordinates x and speeds $\dot{x}$ in Cartesian space into angles q and rotation speeds $\dot{q}$ in joint space using $$\dot{q} = J^{-1}\dot{x}.$$

When the TCP 7 is moved, its coordinate in the direction of motion may be force-controlled, whereas positions perpendicular to the direction of motion will usually be position controlled. Force-control is implemented using nested control loops. Based on an actual contact force $f_{act}$ to which the TCP 7 is subject and a reference force $f_{ref}$, force controller 11 outputs a target speed $\dot{x}_{ref}$ in Cartesian coordinates. This target speed $\dot{x}_{ref}$ is transformed into speeds $\dot{q}_{ref}$ of the joints 6$j$ by coordinate transformer 12. Conventionally, this transformation would be made using eqn.

$$\dot{q}_{ref} = J^{-1}\dot{x}_{ref}.$$

Speed controller 13 compares the target rotation speed vector $\dot{q}_{ref}$ and the vector of actual rotation speeds $\dot{q}_{act}$ of the joints and, based on the result of the comparison, increases or decreases the torques $\tau_{mot}$ of the motors driving the joints 6$j$ so as to minimize the difference between $\dot{q}_{ref}$ and $\dot{q}_{act}$.

While the TCP 7 is advancing unimpeded, the actual contact force $f_{act}$ can be assumed to vanish, so that a constantly high target speed $\dot{x}_{ref}$ is output by force controller 11. When the TCP 7 unexpectedly hits an obstacle, the contact force $f_{act}$ rises abruptly. A fast and aggressive force controller 11 can then result in fast changes of the Cartesian target speed $\dot{x}_{ref}$ which in turn leads to large magnitudes of joint level acceleration in the robot arm 1.

The present invention avoids this problem by the coordinate transformer 12 calculating $\dot{q}_{ref}$ not by a mere matrix transformation but instead finding the vector $\dot{q}_{ref}^k$ which minimizes a weighted sum of the form $$\frac{1}{2}\alpha\|\dot{x}_{ref}^k - J\dot{q}_{ref}^k\|_{W_x} + \frac{1}{2}\beta\frac{1}{T_s}\|\dot{q}_{ref}^k - \dot{q}_{ref}^{k-1}\|_{W_a}, \quad (1)$$

wherein k denotes a time instant at which coordinates $x_{ref}^k$, $q_{ref}^k$ are determined, $T_s$ is the time between instant k and a previous instant k−1 at which coordinates $x_{ref}^{k-1}$, $q_{ref}^{k-1}$ have been determined, $\alpha$, $\beta$ are arbitrary weighting constants, and $\|V\|_w$ is a generalized absolute value of the vector v:

$$\|x\|_W = [x_1 \cdots x_n] \cdot W \cdot \begin{bmatrix} x_1 \\ \vdots \\ x_n \end{bmatrix}.$$

$W_x$ is a diagonal weighting matrix that allows to emphasize positioning accuracy in specific Cartesian directions. For example, $W_x$ can have the form $$W_x = \text{diag}(a, a, 1, 1, 1, 1) = \begin{bmatrix} a & & & & & \\ & a & & & & \\ & & 1 & & & \\ & & & 1 & & \\ & & & & 1 & \\ & & & & & 1 \end{bmatrix}, 0 \le a < 1 \quad (2)$$

if deviations from a target value in x and y directions is to be weighted less than a deviation in z direction. Of course, any other one or more diagonal elements of the matrix might be selected to be smaller than 1. Further, a weighting matrix $W_x$ that weights deviations in an arbitrary plane or direction less than in other directions can be written as $$W_x = R^T \begin{bmatrix} a & & & & & \\ & a & & & & \\ & & 1 & & & \\ & & & 1 & & \\ & & & & 1 & \\ & & & & & 1 \end{bmatrix} R, \text{ wherein}$$

$$R = \begin{bmatrix} \begin{bmatrix} E \end{bmatrix} & & & \\ & 1 & & \\ & & 1 & \\ & & & 1 \end{bmatrix},$$

and E is a 3*3 Euler Matrix.

Alternatively, one or more of the $4^{th}$ to $6^{th}$ diagonal elements of the diagonal matrix $W_x$ can be smaller than 1, the rest being=1, in order for the position of the TCP 7 to be controlled strictly while allowing deviations of its orientation. As an example, setting the last diagonal element of $W_x$ to 0 results in completely ignoring the orientation of the TCP with respect to the z-axis, which might be useful in drilling applications.

Similarly, $W_\alpha$ is a diagonal weighting matrix that allows to put specific emphasis on minimizing accelerations in selected joints. For instance, if it is assumed that the robot arm has six degrees of rotational freedom, the first two relating to joints 61, 62 between base 3 and a proximal link 51, the next two relating to joints 63, 64 between proximal link 51 and distal link 52, and the last two relating to joints 65, 66 between distal link 52 and end effector 4, then $W_\alpha$ may conveniently be defined as $$W_\alpha = \text{diag}(1,1,\alpha,\alpha,b,b) \quad (3)$$

wherein $1 > \alpha > b$, so that if the movement of the TCP is blocked by an obstacle, the distal joints 65, 66 are rather free to yield, whereas the intermediate joints 63, 64 are controlled more strictly, and the proximal joints 61, 62 most strictly of all.

The vector $\dot{q}_{ref}^k$ which minimizes expression (1) is given by $$\dot{q}_{ref}^k = \left(\alpha J^T W_x J + \frac{\beta}{T_S} W_\alpha\right)^{-1} \cdot \left(\alpha J^T W_x \dot{x}_{ref}^k + \frac{\beta}{T_S} W_\alpha \dot{q}_{ref}^{k-1}\right), \quad (4)$$

so according to an embodiment of the invention this is the $\dot{q}_{ref}$ output at instant k by the coordinate transformer 12.

If it is assumed that the weighting matrix $W_\alpha$ employed by coordinate transformer 12 is the one of eq. (3), the distal joints of the robot arm 1 are rather free to yield when the movement of the TCP 7 is blocked, e.g. by hitting on the surface 9 of workpiece 10 earlier than expected. Therefore, not all the impulse of the moving robot arm will weigh on TCP 7, possibly causing a dent in surface 10, but, since the position of TCP 7 is controlled strictly, the soldering tool will rotate about the pivotal point formed by the TCP 7 touching the surface 10, as shown in dashed lines in FIG. 1, thereby keeping pressure on the surface 10 low while the links 51, 52 are gradually decelerated.

Figure 2:
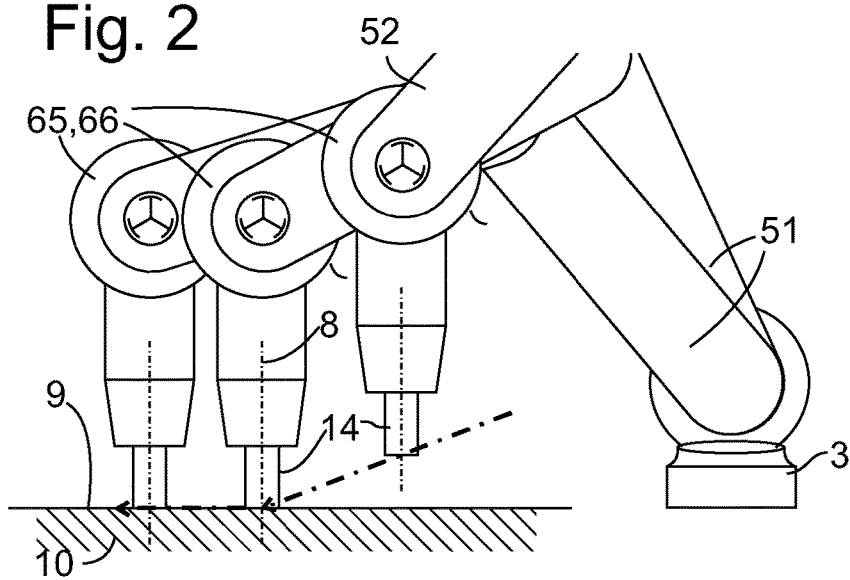
FIG. 2 shows the robot system equipped with another tool.

On the other hand, allowing the distal joints 65, 66 to yield may damage the workpiece surface 10 if the robot arm 1 wields another type of tool, such as e.g. a milling or grinding tool shown in different positions in FIG. 2. If the tool is e.g. a cylindrical milling cutter 14 which should approach the workpiece surface 10 with its axis of rotation 8 parallel to the surface 10 normal, any tilting of the cutter axis 8 will cause the cutter 14 to dig into the surface 10. Under these circumstances it is appropriate to use the weighting matrix $W_x$ of eq. 2: due to the $3^{rd}$ to $6^{th}$ elements of the matrix being 1, both the pose (orientation) of the cutter 14 and its position in the z direction of the workpiece surface normal are strictly controlled; on the other hand, low or vanishing $1^{st}$ to $2^{nd}$ diagonal elements allow to reduce angular accelerations of the joints 61-66 by allowing the tool to be displaced parallel to the workpiece surface 10 after coming into contact with it. A thick dash-dot line illustrates the path of the TCP of milling cutter 14. Initially, it approaches the surface 10 along an oblique path, so that the end effector 4 and the distal link 52 both have momentum in directions both parallel and perpendicular to the workpiece surface 10. When the TCP hits the surface, it can no longer advance in the z direction, but displacement in y- and z directions is still possible, and by allowing the end effector 4 to move on in x and y directions after displacement in the z direction has been blocked, angular accelerations can be kept low.

When the robot arm 1 is controlled using eq. (4), joint angle limits may be hit as they are not taken into account. To solve this issue, the weighted sum of eq. (1) can be augmented by a third summand as follows $$\frac{1}{2}\alpha\|\dot{x}_{ref}^k - J\dot{q}_{ref}^k\|_{W_x} + \frac{1}{2}\beta\frac{1}{T_S}\|\dot{q}_{ref}^k - \dot{q}_{ref}^{k-1}\|_{W_\alpha} + \gamma \Psi^T \dot{q}_{ref}^k, \quad (5),$$

in which case eq. (4) above is replaced by $$\dot{q}_{ref}^k = \left(\alpha J^T W_x J + \frac{\beta}{T_S} W_\alpha\right)^{-1} \cdot \left(\alpha J^T W_x \dot{x}_{ref}^k + \frac{\beta}{T_S} W_\alpha \dot{q}_{ref}^{k-1} - \gamma \Psi\right), \quad (6)$$

The term $\gamma \Psi^T \dot{q}_{ref}^k$ penalizes joint level motion towards joint limits. The vector $\Psi^T = [\Psi_1(q_1), \ldots, \Psi_N(q_N)]$ depends on the actual joint angles $q_{act}$. The components of the vector $\Psi^T$ can be defined in various ways. One option is $$\psi_i(q_i) \begin{cases} -m\left(\dfrac{q_i - a_i}{q_{i,min} - a_i}\right)^n & q_{i,min} \le q_i \le a_i \\ 0 & \text{if } a_i \le q_i \le b_i, i = 1, \ldots, N \\ m\left(\dfrac{q_i - b_i}{q_{i,max} - b_i}\right)^n & b_i \le q_i \le q_{i,max} \end{cases} \quad (7)$$

wherein the exponent n is a small integer 1, 2, .... A graph A of $\Psi_i(q_i)$ for n=1 is illustrated in FIG. 3. Another option is $$\psi_i(q_i) \begin{cases} \ln\left(\dfrac{q_i - q_{i,min}}{q_{i,min} - a_i}\right) & q_{i,min} \le q_i \le a_i \\ 0 & \text{if } a_i \le q_i \le b_i, i = 1, \ldots, N \\ -\ln\left(\dfrac{q_i - q_{i,max}}{q_{i,max} - b_i}\right) & b_i \le q_i \le q_{i,max} \end{cases} \quad (8)$$

as shown by curve B in FIG. 3. If a joint 6*i* is close to its positive angle limit $q_{i,max}$, a positive speed $\dot{q}_{ref}^k$ will thus be penalized, while a negative speed reduces the weighted sum (5). Instead of a linear relationship, quadratic or higher exponents n can be used. According to eq. (8), $\Psi_i(q_i)$ diverges beyond all bounds when $q_i$ approaches its limits $q_{i,min}$ or $q_{i,max}$, whereby it can be ensured that no joint limit will be violated.

It should be noted that although according to the above description the coordinate transformer 12 evaluates eq. (4) or (6), this might be done as well in any of the other components of controller 2. Moreover, the concept of finding the joint speed vector $\dot{q}_{ref}^k$ which minimizes the weighted sums of eq. (1) or (5) is applicable also to control loops having a structure different from the one shown in FIG. 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling movement of a robot comprising a plurality of links connected by rotatably driven joints, the method comprising the steps of:
   a) defining a target speed vector of a reference point of the robot in Cartesian space;
   b) determining rotation speeds ($\dot{q}_{ref}$) of the joints which minimize a weighted sum, the weighted sum having for summands
      i) a discrepancy (($\|\dot{x}_{ref}^k - J\dot{q}_{ref}^k\|_{W_x}$) between the target speed vector ($\dot{x}_{ref}$) and an actual speed vector ($\dot{x}_{act}$) calculated from actual rotation speeds of the joints; and
      ii) a rate of change $$\left(\frac{1}{T_S}\|\dot{q}_{ref}^k - \dot{q}_{ref}^{k-1}\|_{W_a}\right)$$

of the target rotation speeds; and
   c) setting the rotation speeds ($\dot{q}_{ref}$) determined in step (b) as target rotation speeds of the joints.

2. The method of claim 1, wherein the discrepancy ($\|\dot{x}_{ref}^k - J\dot{q}_{ref}^k\|_{W_x}$) between the target speed vector ($\dot{x}_{ref}$) and an actual speed vector ($\dot{x}_{act}$) is weighted by direction of translation and/or rotation.

3. The method of claim 1, wherein a movement of the robot approaches a workpiece surface, and a discrepancy in a direction perpendicular to the workpiece surface is weighted more than a discrepancy in a direction parallel to the workpiece surface.

4. The method of claim 1, wherein the rate of change $$\left(\frac{1}{T_S}\|\dot{q}_{ref}^k - \dot{q}_{ref}^{k-1}\|_{W_a}\right)$$

is weighted by joint.

5. The method of claim 4, wherein an angular acceleration in a proximal joint is weighted more than an angular acceleration in a distal joint.

6. The method of claim 1, wherein the discrepancy comprises a scalar product of a vector difference ($\dot{x}_{ref}^k - J\dot{q}_{ref}^k$) between the target speed vector ($\dot{x}_{ref}$) in Cartesian space and a speed vector ($J\dot{q}_{ref}^k$) in Cartesian space calculated from the determined rotation speeds, and the vector difference ($\dot{x}_{ref}^k - J\dot{q}_{ref}^k$) multiplied by a weighting matrix ($W_x$).

7. The method of claim 1, wherein the rate of change ($\|\dot{q}_{ref}^k - \dot{q}_{ref}^{k-1}\|_{W_x}$) of the target rotation speeds is calculated as the scalar product of a vector difference between a vector of the target rotation speeds ($\dot{q}_{ref}^k$) and the vector of rotation speeds ($\dot{q}_{ref}^{k-1}$) at a previous instant (k−1) multiplied by a weighting matrix ($W_\alpha$ W).

8. The method of claim 1, wherein an angle range of at least one of the joints is limited, and a third summand ($\gamma \Psi^T \dot{q}_{ref}^k$) of the weighted sum is neutral when the at least one of the joints is far from a limit of the angle range and is high when the at least one of the joints is close to and approaching the limit and/or which is low when the when the at least one of the joints is close to and moving away from the limit.

9. The method of claim 8, wherein the third summand ($\gamma \Psi^T \dot{q}_{ref}^k$) diverges at the limit.

\* \* \* \* \*